…

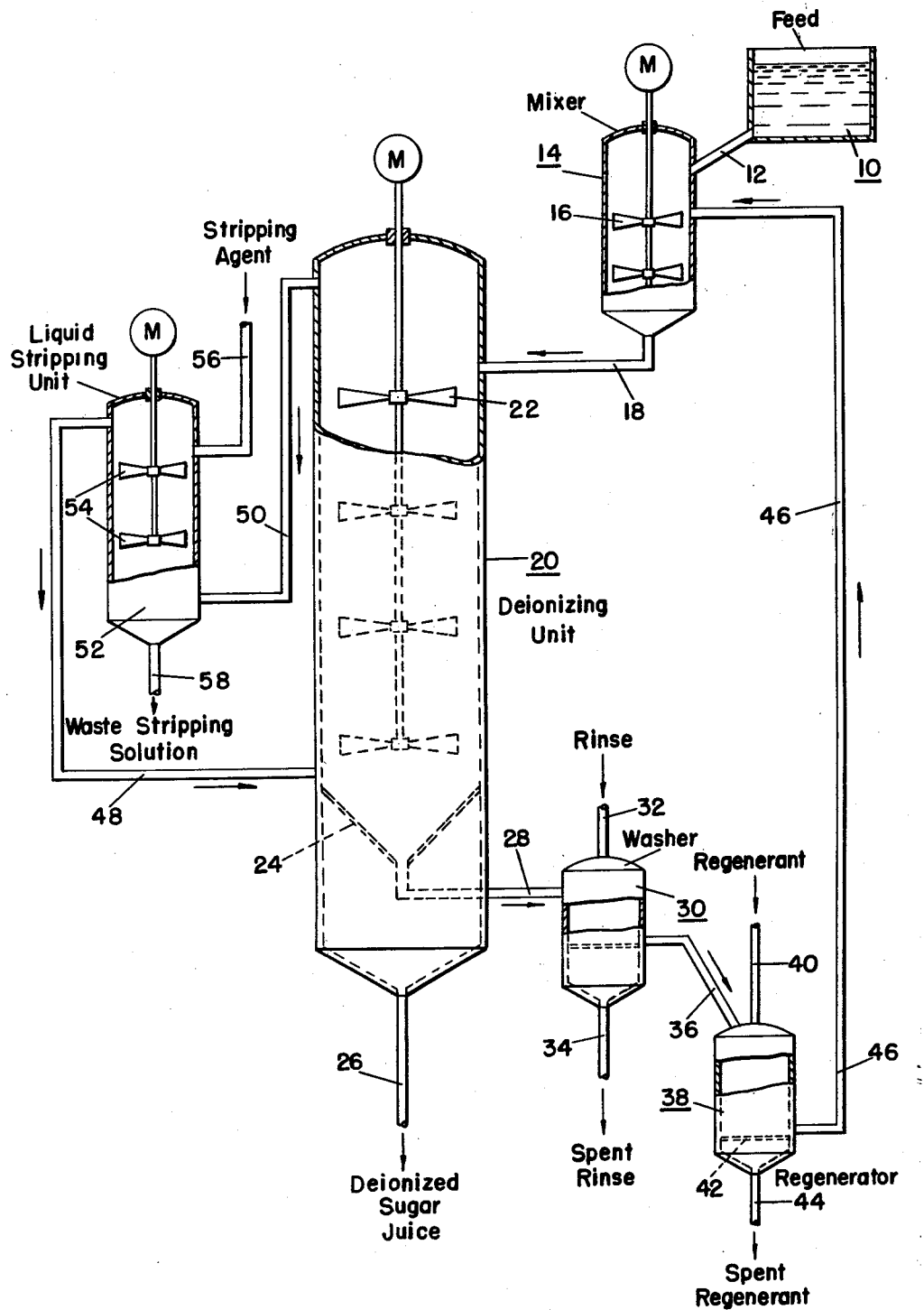

United States Patent Office 3,074,820
Patented Jan. 22, 1963

3,074,820
LIQUID-SOLID ION EXCHANGE PROCESS
Robert Kunin, Yardley, Pa., assignor to Rohm & Haas Company, Philadelphia, Pa., a corporation of Delaware
Filed July 28, 1960, Ser. No. 45,991
16 Claims. (Cl. 127—46)

This invention concerns treating fluids by ion exchange processes using mixed cation-anion exchanger systems in which one of the exchangers is a liquid and the other is a solid. More particularly, it concerns a process for continuously deionizing fluids employing a cation-anion exchanger mixture in which one of the exchangers is a liquid and the other is a solid.

As used hereinbefore and hereinafter, the term "deionizing" is used to denote the substantially complete removal of cations and anions from fluids. This process is sometimes referred to as "desalting" and, much less commonly, as "demineralizing."

The concept of using beds of mixed exchangers of the cation and anions exchanger type, while by no means old, has met with rapid aceptance and widespread use. There are, however, some difficulties encountered which, if they could be overcome, would result in marked improvement in the operation of such units. One of the serious difficulties encountered in some so-called "mixed bed" systems is the problem of separating the two solid resin components. This difficulty is frequently referred to as "clumping" and apparently results from a temporary attraction of the hydrogen form of the cation exchanger to the free base form of the anion exchanger. Methods have been devised which will overcome this clumping tendency but they require the use of additional chemicals and require an additional step in the regeneration process.

It has been found that many of the difficulties encountered in the operation of mixed beds consisting of solid cation exchangers and solid anion exchangers can be overcome by operating with a mixed bed which consists of either a liquid cation exchanger and a solid anion exchanger or a solid cation exchanger and a liquid anion exchanger. Although the chemical reactions involved are substantially the same as when operating the solid-solid bed, the ease of separation of the liquid-solid bed overcomes many of the difficulties previously encountered. Furthermore, because of this ease of separation, it is possible to devise systems for continuous operation which are simple and trouble-free.

The liquid-solid mixed bed process can be operated as a batch process or, as noted hereinbefore, as a continuous process. When employing a batch process, the liquid to be deionized is placed in a suitatble vessel equipped with an agitator, the cation and anion exchangers are added, the mixture is agitated for a sufficient period of time to permit deionization, the agitation is stopped, the deionized liquid is removed by any suitable means such as siphoning, and the liquid exchanger is separated from the solid exchanger by any suitable means, such as filtration, centrifugation, etc. However, this liquid-solid batch process has the same disadvantage as a solid-solid batch process in that an equilibrium is reached and it is much more difficult to obtain substantially complete deionization than it is with a columnar or countercurrent process.

By a simple continuous countercurrent process employing the liquid-solid exchangers, it is possible to obtain rapid and complete deionization of fluids. The continuous process and the proposed equipment therefor will be described in detail hereinafter but it consists of contacting the fluid with the mixed liquid-solid exchangers and continuously removing the spent exchangers from the deionized fluid. The exchangers are readily separated, are separately regenerated and rinsed and continuously returned, in a regenerated state, to the contactor or deionizer unit.

Typical solid cation exchangers which can be empolyed in these processes are those which are capable of being repeatedly converted to the hydrogen form, as well as resistant to mild attrition. These include the well-known sulfonated coal, the sulfonated phenol-formaldehyde types and, most preferred, the sulfonated cross-linked styrene cation exchangers, the preparation of which is set forth in U.S. Patent 2,366,007. There may also be used carboxylic exchangers, the preparations of which are set forth in U.S. Patent No. 2,340,111.

The liquid cation exchangers which can be employed in the process of this invention are high molecular weight acids which are characterized by low water-solubility. Typical of such acids are the di-higher alkyl phosphoric and phosphinic acids such as di-2-ethylhexyl phosphoric and phosphinic acids. Also typical are the mono-higher alkyl phosphoric and phosphinic acids of which the 2-ethylhexyl and the 2,6,8-trimethyl-4-nonyl esters are typical. Higher alkyl in all cases refers to a carbon atom content of 6 to 10 carbon atoms. Halogenated higher molecular weight organic acids are also suitable, typical of this class being perfluorooctanoic acid.

The solid anion exchangers which can be employed in these processes are those which are capable of being repeatedly converted to the free base form as well as resistant to mild attrition. Typical of such anion exchangers are the phenol-formaldehyde amine condensation types, the preparation of which is set forth in U.S. Patent 2,402,384; the chloromethylated and aminated products of such copolymers as styrene-divinylbenzene, the preparation of which is set forth in U.S. Patents 2,591,573 and 2,591,574. In the case of the latter type anion exchanger, it may be prepared by aminating with a primary, secondary, tertiary or a hydroxyl modified amine to give resins of varying degrees of basicity. A preparation of a modification of this type of anion exchanger is set forth in U.S. Patent 2,900,352. Other less preferred anion exchangers are those based on condensates of urea, melamine, guanidine, etc.

The liquid anion exchangers which can be employed in the process of the present invention are high molecular weight amines characterized by low water-solubility. Primary, secondary and tertiary amines can be used. Thus, tert-alkyl primary amines containing 8 to 25 carbon atoms are satisfactory, and typical examples are t-octylamine, t-dodecylamine, and pentacosylamine. Secondary amines such as dodecyl-tert-dodecylamine, nonyldodecylamine, and lauryloctadecylamine are typical of those which are satisfactory. Tertiary amines, such as n-amyldidocenylamine, butyldioctadecylamine, trioctylamine, tribenzylamine and trilaurylamine are also suitable.

Although both the liquid cation exchanger and the liquid anion exchanger can be used as such, it is preferred that they be used as solutions in an inert water-insoluble solvent. Typical classes of solvents which are suitable are aliphatic and aromatic hydrocarbons and alkanols containing more than 6 carbon atoms. Representative specific solvents are kerosene, heptane, isooctane, gasoline, benzene, toluene, xylene, 2-ethylhexanol, n-octanol, decanol, and dodecanol. Ketones containing more than six carbon atoms are also suitable including octanone, decanone, methyl hexyl ketone, etc. The concentration of the exchanger in the solution will vary somewhat depending on the particular fluid being treated but a concentration of about 3 to about 15 percent by weight is preferred.

A typical equipment arrangement for continuous deionization of a fluid is shown in the drawing. Numerous changes can be made in the equipment which will still be within the scope of the invention. Although the process will be described for the deionization of a sugar juice, the same process is applicable, sometimes with minor modifications, for other fluids as set forth hereinafter. The process will be described using a liquid anion exchanger, such as a high molecular weight organic amine such as a dodecenyl-t-alkylamine in which the alkyl group contains 12 to 18 carbon atoms, being present in a kerosene solution to the extent of 10 percent by weight, and a solid cation exchanger, such as a sulfonated styrene-divinylbenzene copolymer, as described in U.S. Patent 2,366,007. The sugar juice is supplied from feed source 10 through pipe 12 to mixer 14. Said mixer is equipped with agitating means 16 which intimately mixes the regenerated (acid form) of the cation exchanger which is fed to the mixer 14 through pipe 46. The mixture is fed through pipe 18 to the deionizing unit 20. Deionizing unit 20 is equipped with agitating means 22 and separating means 24. Means 24 can be a corrosion resistant screen, the mesh size being such that the cation exchanger will not pass through nor blind the screen. The cation exchange resin and the sugar juice pass downwardly through the unit, the resin being screened out by screen 24, and passing out pipe 28 to washer 30. The sugar juice passes out pipe 26 to storage or for further processing. Water flows from pipe 32 into washer 30, rinsing the resin, the spent rinse passing through pipe 34. The rinsed resin goes through pipe 36 into the continuous regenerator 38 which regenerator has a corrosion resistant retaining screen 42, said screen being of such a mesh size that the resin will not pass through nor blind the screen. The resin is then regenerated in situ in the conventional manner using a dilute regenerant solution of a mineral acid, such as hydrochloric or sulfuric acid. This regenerant solution enters the regenerator through pipe 40. When the required amount of regenerant has been passed through the resin, the resin is then rinsed again with water, the water also entering the regenerator through pipe 40. The spent regenerant and the rinse pass through pipe 44. The regenerated and rinsed resin passes through pipe 46 to mixer 14.

Concurrently with the addition of the cation exchanger and sugar juice entering the unit through pipe 18, there is passed through pipe 48 the liquid anion exchanger. Because the density of the liquid anion exchanger is less than that of the sugar solution, it gradually floats upward to the top of the deionizing unit 20. It is there taken off through pipe 50 and passed to stripping unit 52, said stripping unit being equipped with agitating means 54. Down through pipe 56 is passed the stripping agent which will be an alkaline material, such as an aqueous solution of ammonia, sodium carbonate, sodium hydroxide, and, in some cases, sodium bicarbonate. After a period of agitation sufficient to effect regeneration or stripping of the liquid anion exchanger, the liquid anion exchanger slowly floats to the top of the stripping unit and passes down through pipe 48 to return to the deionizing unit. The waste stripping solution from the stripping unit 52 passes down through pipe 58.

When a liquid cation exchanger and a solid anion exchanger, both hereinbefore described, are used, substantially the same chemical reactions occur, except that it is the anion exchange resin which moves down through the deionizing unit and the liquid cation exchanger which enters the deionizing unit at pipe 48. In the regenerator, the solid anion exchange resin is regenerated in the conventional manner with an aqueous alkali solution. The same alkali solutions used to regenerate the liquid anion exchanger can be used to regenerate the solid anion exchanger. Similarly, the same regenerants can be used to strip or regenerate the liquid cation exchanger as were used to regenerate the solid cation exchange resin, as set forth hereinbefore.

While it is shown in the drawing and in the detailed description thereof that the process is very applicable to the deionizing of sugar juices, the same type of equipment, or with minor modification, is equally applicable to the deionization of other fluids.

Thus, if the fluid to be deionized contains no non-ionizable solids which are to be recovered, it is not necessary to have the washer 30 ahead of the regenerator 38. Similarly, if the solution being deionized carries ionized values which are to be recovered, they can be recovered from the waste stripping solution at 58 and/or from the regenerator at 44.

It is also true that the continuous process shown in the drawing can be employed for the deionization of solutions which contain non-ionizable materials other than sugar which it is desired to recover. Thus, aqueous solutions of glycerin can be deionized and the deionized solution readily separated from the exchangers and recovered. In this case, the washer 30 should be included in the equipment in order to "sweeten off" the resin so that glycerin is not wasted in the regenerant. In a like fashion aqueous solutions of many other non-ionizable materials can be efficiently and continuously deionized.

The application of the principles of this invention is not limited to deionization processes. Particularly in the cane sugar industry, there is the desire to convert any sulfate ion in sugar solutions to the chloride ion and to remove any calcium ions present and substitute therefor the less objectionable sodium ion; whereas untreated sugar solutions are frequently hazy, sugar solutions treated as set forth above are clear and sparkling. If the solutions are to be crystallized, it has been found that this treatment decreases the amount of impurities occluded during the crystallization process. Furthermore, if the sugar solution is treated by this process prior to concentration by evaporation, scaling of the evaporators is decreased. Operating the process of this invention to effect the desired exchange of ions, the anion exchanger is used in the form of the hydrochloride and the cation exchanger is employed in the sodium form. Both exchangers, when depleted, are regenerated with aqueous sodium chloride solutions. As hereinbefore set forth in the description of the deionization process, the combinations of a liquid anion exchanger and a solid cation exchanger or a solid anion exchanger and a liquid cation exchanger can be used.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

As set forth hereinbefore, the process of the present invention can be operated batchwise as well as on a continuous basis. Batchwise experiments were conducted using three different high molecular weight water-insoluble organic amines as the anion exchangers and two different carboxylic and one sulfonic cation exchange resins. The cation exchange resins were all in the acid or hydrogen form. The amines were in the free base form and were used as 10 percent (by volume) solutions in triedecyl alcohol. Beet juice with a Brix of 20, pH of 8.0 and an electrical resistance of 117 ohm-cm. was used as the solution to be deionized. To 100 ml. of beet juice was added 25 ml. of the amine solution and 25 ml. of wet (approximately 40 to 50% moisture) cation exchange resin. The mixture was agitated for one hour to insure intimate admixing. At the end of the hour, the aqueous phase was separated and the pH and electrical resistance measured. The results are given in Table I:

*Table I*

| Anion Ex- changer | Cation Ex- changer | Elec. Resistance (ohm-cm.) | pH | Percent Imp. Remov. |
|---|---|---|---|---|
| --- | --- | 120 | 8.0 | --- |
| 1 | 4 | 160 | 5.2 | 25 |
| 2 | 4 | 160 | 5.4 | 25 |
| 3 | 4 | 140 | 4.9 | 13 |
| 1 | 5 | 210 | 4.0 | 42 |
| 1 | 6 | 260 | 1.6 | 54 |

NOTES:
1—The amine used was tert-dodecyldodecenyl amine.
2—The amine used was tert-dodecyllauryl amine.
3—The amine used was tert-butyldodecenyl amine.
4—The resin used was a methacrylic acid-divinylbenzene copolymer containing 5 percent divinylbenzene.
5—The resin was a hydrolyzed acrylate ester-divinylbenzene copolymer containing 5 percent divinylbenzene.
6—A sulfonated copolymer of styrene-divinylbenzene containing 8 percent divinylbenzene was used.

The less than complete deionization which occurred can be partially accounted for by the fact that the first four cation exchangers were carboxylics, and it is well-known that the carboxylics do not give complete deionization. There was a substantial increase when the sulfonic was used. Furthermore, as set forth hereinbefore, batchwise treatment does not give complete deionization.

EXAMPLE II

As set forth hereinbefore, the process of the present invention can be operated on a continuous, countercurrent basis as well as batchwise as described in Example I. A continuous, countercurrent experiment was conducted using a 10 percent tertiary-dodecyldodecenylamine solution in kerosene as the liquid anion exchanger and a hydrolyzed acrylate ester-divinylbenzene copolymer containing 5 percent divinylbenzene as the solid cation exchanger. The apparatus used was essentially that described in the drawing. The solution to be deionized was was an aqueous solution containing 1000 parts per million of calcium sulfate. A 4 percent aqueous solution of ammonia was used for stripping or regenerating the liquid amine anion exchanger and a 10 percent aqueous solution of hydrochloric acid was used as the regenerant for the solid cation exchanger. The flow rates of the various components employed for this experiment are given in Table II:

*Table II*

| Component: | Flow rate (cc./minute) |
|---|---|
| Feed (1000 p.p.m. CaSo₄) | 100 |
| Liquid exchanger | 10 |
| Solid exchanger | 10 |
| NH₄OH | 2 |
| HCl | 2 |

After steady state was reached, an analysis of the depleted feed indicated that 75 percent of the dissolved solids in the feed had been removed. These results, when compared with the data in Table I, illustrate the advantages of the countercurrent method of operation.

EXAMPLE III

An experiment was conducted by the process substantially as shown in Example II except that a 10% toluene solution of di(2-ethylhexyl) phosphoric acid was employed as a liquid cation exchanger and a styrene-divinylbenzene copolymer containing 4.5% divinylbenzene which had been chloromethylated and aminated with trimethylamine was employed as the solid anion exchanger. Results comparable to those in Example II were obtained.

I claim:

1. A process for the removal of cations and anions from solutions containing them which comprises contacting said solution with an intimate mixture of a cation exchanger selected from the group consisting of liquid and solid cation exchangers and an anion exchanger selected from the group consisting of liquid and solid anion exchangers and an anion exchanger selected from the group consisting of liquid and solid anion exchangers, one and only one of said exchangers being a liquid, said liquid exchanger being dissolved in an inert water-insoluble solvent, and removing solutions from the cation and anion exchanger mixture.

2. A process as set forth in claim 1 in which the cation exchanger is in the sodium form, the anion exchanger is in the chloride form and the solution being treated is an aqueous sugar solution.

3. A process as set forth in claim 1 in which the cation exchanger is a liquid and the anion exchanger is a solid.

4. A process as set forth in claim 3 in which the liquid cation exchanger is selected from the group consisting of mono-higher alkyl and di-higher alkyl esters of phosphoric and phosphinic acids and perfluorooctanoic acid.

5. A process as set forth in claim 3 in which the solid anion exchanger is an anion exchange resin selected from the group consisting of weakly basic anion exchangers, tertiary anion exchangers and quaternary anion exchangers.

6. A process as set forth in claim 5 in which the anion exchanger is a resin formed by chloromethylating a cross-linked styrene-divinylbenzene copolymer and subsequently aminating said chloromethylated polymer with an amine.

7. A process as set forth in claim 1 in which the cation exchanger is a solid and the anion exchanger is a liquid.

8. A process as set forth in claim 7 in which the solid cation exchanger is a cation exchange resin selected from the group consisting of insoluble polymers containing sulfonic acid groupings and insoluble polymers containing carboxylic acid groups.

9. A process as set forth in claim 8 in which the cation exchanger is a sulfonated cross-linked styrene-divinylbenzene copolymer.

10. A process as set forth in claim 7 in which the anion exchanger is a water-insoluble amine.

11. A process as set forth in claim 10 in which the water-insoluble amine is dissolved in an inert water-insoluble hydrocarbon.

12. A process as set forth in claim 10 in which the inert water-insoluble hydrocarbon is kerosene.

13. A process for the removal of cations and anions from solutions containing them which comprises contacting said solution under agitation with an intimate mixture of a cation exchanger in the hydrogen form selected from the group consisting of liquid and solid cation exchangers and an anion exchanger in the free base form selected from the group consisting of liquid and solid anion exchangers, one and only one of said exchangers being a liquid, said liquid exchanger being dissolved in an inert water-insoluble solvent, and removing the deionized solutions from the cation and anion exchanger mixture.

14. A continuous countercurrent process for treating solutions for the removal of cations and anions therefrom which comprises countercurrently contacting said solutions under agitation in a reaction zone with an intimate mixture of (1) a cation exchanger selected from the group consisting of liquid and solid cation exchangers and (2) an anion exchanger selected from the group consisting of liquid and solid anion exchangers, one and only one of said exchangers being a liquid, said liquid exchanger being dissolved in an inert water-insoluble solvent, continuously removing said treated solutions from the reaction zone and the admixture of the cation and anion exchangers, removing the cation and anion exchangers separately from the reaction zone, separately regenerating said cation and anion exchangers outside of the reaction zone, and returning said cation and anion exchangers to the reaction zone.

15. A process as set forth in claim 14 in which the anion exchanger is a liquid water-insoluble amine.

16. A process as set forth in claim 15 in which the cation exchanger is a sulfonated copolymer of styrene and divinylbenzene.

References Cited in the file of this patent

UNITED STATES PATENTS 2,563,006     Collier _____ Aug. 7, 1951

UNITED STATES PATENT OFFICE
CERTIFICATE OF CORRECTION

Patent No. 3,074,820                              January 22, 1963

Robert Kunin

It is hereby certified that error appears in the above numbered patent requiring correction and that the said Letters Patent should read as corrected below.

Column 6, lines 11 and 12, strike out "and an anion exchanger selected from the group consisting of liquid and solid anion exchangers", line 52, for the claim reference numeral "10" read -- 11 --.

Signed and sealed this 6th day of August 1963.

(SEAL)
Attest:

ERNEST W. SWIDER
Attesting Officer

DAVID L. LADD
Commissioner of Patents